Patented May 29, 1945

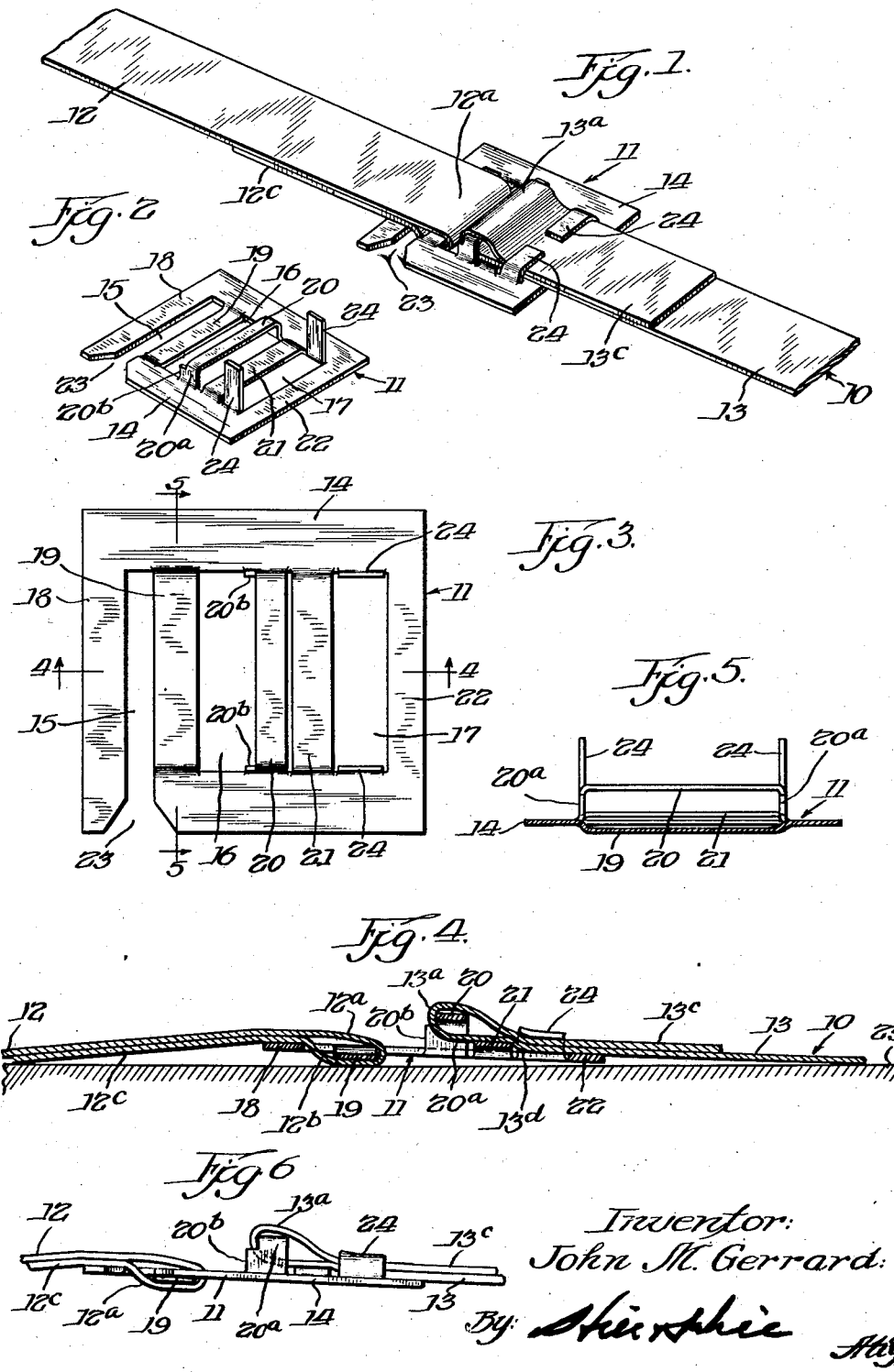

2,377,224

UNITED STATES PATENT OFFICE 2,377,224

SEAL

John M. Gerrard, Chicago, Ill.

Application September 9, 1943, Serial No. 501,606

6 Claims. (Cl. 24—23)

This invention relates to a seal of the kind used to fasten the loose ends of a band employed for packing and crating purposes.

Various kinds of seals have been manufactured for this purpose, which, however, require deformation thereof as well as deformation of the ends of the band in order to securely fasten the ends thereof.

One of the objects of this invention is the provision of a seal capable of use in connection with a metallic band or with a non-metallic band such, for instance, as a band made of fibrous materials or cloth which, I have found, are tough and have great tensile strength comparable with that of metallic bands of the same size.

Another object is the provision of a seal for fastening the ends of a band which can be applied to the ends of the band without deforming the same.

Another object is the provision of a seal which can be easily and readily applied to and fastened upon the ends of a band without any danger of slippage of the loose ends of the band through the seal.

Other objects and advantages will appear in the course of this specification and with said objects and advantages in view this invention consists in the several novel features hereinafter fully set forth and claimed.

The invention is clearly illustrated in the drawing accompanying this specification in which:

Fig. 1 is a perspective view of one embodiment of the invention applied to the ends of a band;

Fig. 2 is a perspective view of the seal as it appears before being applied to a band;

Fig. 3 is a plan of the seal;

Fig. 4 is a vertical longitudinal section taken on the line 4—4 of Fig. 3, showing the seal applied to a band;

Fig. 5 is a vertical cross section taken on the line 5—5 of Fig. 3; and

Fig. 6 is a side elevation of the seal applied to a band.

Figs. 3 to 6, inclusive, are upon an enlarged scale.

Referring to said drawing, the reference character 10 designates fragments of a flat band adapted to be wrapped around a container, crate, package, box or other object with its ends fastened together by a seal 11 constructed in accordance with the present invention. One end 12 of the band is looped around an anchoring member of the seal and over an adjacent bar thereof and underlies a contiguous portion of the band. The other end 13 of the band is looped around a second anchoring member of the seal and is fastened thereto by bendable members of the seal as will be hereinafter described. As is well understood, a band tensioning device is employed to tighten the band around the object and a sealing device is employed to fasten the seal to one end of the band but as these devices have nothing to do with the present invention they are neither shown nor described.

The seal 11 desirably is struck up by suitable dies from sheet metal of suitable gauge and comprises a plate 14 of generally rectangular form having transversely extending slots 15, 16 and 17 spaced apart by transverse bars 18, 19, 20, 21 and 22. The bars 19 and 20 comprise the anchoring members of the seal. The slot 15 is open at one end as shown at 23 to facilitate the insertion of the loose end 12c of the band around the anchoring member 19. The other slots 16—17 are closed at their ends by the two sides of the seal. The anchoring member 19 is offset downwardly slightly whereby the loop 12a is pressed tightly upon the object upon which the band is used, and also to provide a reverse bend 12b in the loose end 12c of the loop at the place where said end passes from the bar 19 to the bar 18, whereby to insure a nonslipping connection between said loose end of the band with the seal. At this end of the band the loose end 12c underlies the contiguous portion of the band and is positively kept from sliding through the seal.

The anchoring member 20 is offset upwardly to receive the looped end 13a of the other end 13 of the band and if desired the bar 21 may also be offset upwardly slightly as seen in Fig. 4, although the offsetting of this bar 21 is not essential to this invention broadly considered.

The offset ends 20a of the anchoring member 20 are made somewhat wider than the bar part of said anchoring member to provide ears 20b that project slightly beyond the looped end of the band whereby to protect the same against the action of the sealing tool which has a jaw that engages the ears 20b when fastening the seal to the end 13 of the band. These projecting ears protect the end of the loop against injury that might be caused by the jaw of the tool pressing against said bend.

In use the loose end 13c of the band is inserted over the bars 22—21 and under and back over the anchoring member 20 so as to lie between tongues 24 after which said tongues are clinched down upon the loose end of the band.

The slot 17 is formed by striking up the two oppositely disposed tongues 24 from the metal between the bars 21—22; these tongues, prior to the application of the seal to the band project upwardly from the opposite ends of the slot 17 and in approximate alignment with the offset ends 20a of the anchoring member 20. It is to be observed that the lengths of the slots 16—17 and the distance between the upright tongues 24 and between the offset ends 20a is a trifle greater than the width of the band so as to facilitate the easy insertion of the band into the seal.

In applying a band and seal to an object, the band is passed around the object and is drawn tightly therearound by a suitable band tightener as is well understood. The loose end 12c has been previously threaded downwardly through the slot 16 and then inserted laterally through the open end of slot 15 and is tucked over the bar 10 so as to lie between the contiguous part of the band and the object.

When the band has been drawn tightly around the object the end 13 of the band is severed from the part usually remaining on the reel and is threaded over the bars 22—21 and underneath the anchoring member 20 and then folded back over the same so as to overlie the contiguous part of the band. The sealing tool is then applied to the seal and the tongues 24 are clinched down upon the loose end 13c, thereby bringing said loose end and the underlying contiguous part of the band into frictional engagement and kinking the loose end and underlying part of the band as seen at 13d in Fig. 4, to positively prevent slippage of the loose end through the seal.

While the seal has been shown of generally flat form it may be curved longitudinally whereby to fasten a band upon a round object.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A seal for fastening the ends of the band around an object comprising a generally rectangular metal plate having a band anchoring member offset downwardly with respect to the general plane of the plate, there being a slot at each side of said anchoring member and a cooperating member at one end of the plate, disposed at the side of one of the slots, said anchoring member being adapted to receive the bend of a looped end of a band extending through said slot between the anchoring and cooperating members in a reverse bend and underlying a contiguous part of the band, a second anchoring member located approximately at the middle of the plate, around which a loop on the other end of the band extends, and tongue means disposed between said second named anchoring member and the adjacent end of the plate adapted to be clinched down upon the second named loop.

2. A seal for fastening the ends of the band around an object comprising a generally rectangular metal plate having a band anchoring member offset downwardly with respect to the general plane of the plate, there being a slot at each side of said anchoring member and a cooperating member at one end of the plate, disposed at the side of one of the slots, said anchoring member being adapted to receive the bend of a looped end of a band extending through said slot between the anchoring and cooperating members in a reverse bend and underlying a contiguous part of the band, an upwardly offset second anchoring member located approximately midway between the ends of the plate, around which a loop on the other end of the band extends, and tongue means disposed between said second named anchoring member and the adjacent end of the plate, adapted to be clinched down upon the second named loop.

3. A seal for fastening the ends of a band around an object comprising a generally rectangular metal plate having a band anchoring member offset downwardly with respect to the general plane of the plate, there being a slot at each side of said anchoring member and a cooperating member at one end of the plate, disposed at the side of one of the slots, said anchoring member being adapted to receive the bend of a looped end of a band extending through said slot between the anchoring and cooperating members in a reverse bend and underlying a contiguous part of the band, and an upwardly offset second anchoring member around which a loop on the other end of the band extends, a pair of spaced apart bars adjacent said second named anchoring member, and oppositely positioned tongues at the ends of the slot formed between said bars and adapted to be clinched down upon the loose end and underlying end of the band.

4. A seal for fastening the ends of a band around an object comprising a generally rectangular plate having a downwardly offset anchoring member and an upwardly offset anchoring member spaced from the first named anchoring member by an intervening slot, a member cooperating with the first named anchoring member to form a reverse bend in the looped end of a band with the loose end of the loop underlying a contiguous part of the band, and that portion of the plate adjacent the upwardly offset anchoring member having tongue members struck up therefrom and cooperating with the second named anchoring member to fasten a second looped end of the band to the seal.

5. In a seal for fastening the ends of a band on an object a generally rectangular plate having an anchoring member around which one end of the band is looped, said plate having an upwardly offset anchoring member around which the other end of the band is looped, said offset anchoring member having loop protecting ears that project longitudinally beyond the bar of the upwardly offset anchoring member around which the end of the band is looped, whereby to protect said loop end from injury when the seal is being applied to a band, and tongues adjacent the offset anchoring member adapted to be clinched down upon the end of the band which is looped around said second named anchoring member.

6. A seal for fastening the ends of a band around an object comprising a generally rectangular metal plate having a band anchoring member offset downwardly with respect to the general plane of the plate, there being a slot at each side of said anchoring member and a cooperating member at one side of the slot, said anchoring member being adapted to receive the bend of a loop with the end of a band extending through said slot between the anchoring and cooperating member in a sharp reverse bend and underlying a contiguous part of the band, a second anchoring member upwardly offset with respect to the general plane of the plate, around which a loop on the other end of the band extends, an upwardly offset bar extending transversely of the plate adjacent said second named anchoring member over which an end of the band extends and tongues formed in that part of the plate adjacent the second named anchoring member, adapted to be clinched down upon the second named loop and being disposed in close proximity to said upwardly offset bar, whereby to bend the two members of the loop over the edge of said bar.

JOHN M. GERRARD.